US00H002252H

(19) United States
(12) Statutory Invention Registration
Bohanan et al.

(10) Reg. No.: US H2252 H
(43) Published: Jan. 4, 2011

(54) INTEGRATED PRE-COLLECTIONS SYSTEM

(75) Inventors: Yvette Bohanan, Beaverton, OR (US); Eric Hopper, Happy Valley, OR (US); Sanjay Khare, Portland, OR (US); Jianning Le, Lake Oswego, OR (US)

(73) Assignee: Vesta Corporation, Portland, OR (US)

(21) Appl. No.: 11/527,920

(22) Filed: Sep. 27, 2006

(51) Int. Cl.
*G06Q 40/00* (2006.01)

(52) U.S. Cl. ..... 705/40

(58) Field of Classification Search ..... 705/40
See application file for complete search history.

(56) References Cited

U.S. PATENT DOCUMENTS

| | | | | | |
|---|---|---|---|---|---|
| 5,109,403 | A | * | 4/1992 | Sutphin | 455/419 |
| 5,334,823 | A | * | 8/1994 | Noblett et al. | 235/380 |
| 5,790,664 | A | * | 8/1998 | Coley et al. | 709/203 |
| 7,191,150 | B1 | * | 3/2007 | Shao et al. | 705/38 |
| 2001/0034722 | A1 | * | 10/2001 | Tidball et al. | 705/73 |
| 2002/0039071 | A1 | * | 4/2002 | Simon | 340/928 |
| 2002/0059139 | A1 | * | 5/2002 | Evans | 705/40 |
| 2002/0123946 | A1 | * | 9/2002 | Haworth et al. | 705/35 |
| 2002/0184146 | A1 | * | 12/2002 | Segler | 705/40 |
| 2003/0078881 | A1 | * | 4/2003 | Elliott et al. | 705/39 |
| 2003/0110044 | A1 | * | 6/2003 | Nix et al. | 705/40 |
| 2007/0094131 | A1 | * | 4/2007 | Wymore et al. | 705/39 |
| 2008/0059363 | A1 | * | 3/2008 | Hotz et al. | 705/38 |
| 2008/0077541 | A1 | * | 3/2008 | Scherer et al. | 705/400 |

OTHER PUBLICATIONS

Rachel, "Sprint Billing Explained", http://www.sprintuser-s.com, Oct. 23, 2005.*
Kim, "Sprint Billing Problems", http://www.consumeraf-fairs.com, Oct. 28, 2002.*

* cited by examiner

*Primary Examiner*—Dan Pihulic
(74) *Attorney, Agent, or Firm*—Beyer Law Group LLP

(57) ABSTRACT

A pre-collections system identifies debtors when they contact a company for a new purchase. A customer service representative (or other automated process) takes payment for the prior debt in real time. The pre-collections system is tightly integrated with an order processing system. Order processing system channels (web site, IVR, CSR, etc.) are enabled to redirect the customer debtor into a corresponding pre-collections system channel. Customers are routed back seamlessly in real time to the point in the order processing system where they left off. The customer is re-instated immediately when their payment is cleared. The system keeps track of blacklisted customers. Logic determines whether to resubmit an item, reclaim a product or service or to immediately collect upon the debt.

12 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Pre-Collections System

Pre-Collections System

Collection Entry Open Response Record

INTEGRATED PRE-COLLECTIONS SYSTEM

FIELD OF THE INVENTION

The present invention relates generally to collections of overdue debt. More specifically, the present invention relates to an automated system and method for the collection of debt integrated with an order processing system.

BACKGROUND OF THE INVENTION

Collection systems are used by a large number of businesses worldwide. In a typical scenario, a business will receive notice from the collection system that a customer's account is unpaid or overdue. The business then calls the consumer requesting payment of the unpaid balance. Typically the consumer is requested to send payment via mail. After this call the process starts over again and will check for payment at a specified time in the future. If payment is not made within a reasonable time the service may be shut off or the company may attempt to repossess the product.

Unfortunately, current collection practices are impractical for bad debt (for example, returned ACH items) of less than $50. Furthermore, if the goods or services purchased are immediately fulfilled and consumed, the lack of timely return information in the ACH system combined with the cost associated with current business practices for collections make collecting on the debt impractical. Yet an originator or ODFI (originating depository financial institution) suffers a material loss if the volume of low value transactions is significant. A merchant or individual may suffer a loss based upon an ACH item that is returned, because of a customer's bounced check, because of a person-to-person payment that cannot be settled, or any of a variety of other reasons. Unfortunately, current collection practices are not suitable for these low-value debts, and a merchant or individual suffers from the loss of a delivered product or service for a debt of any value. As mentioned above, whether the collection is instituted using an in-house process or by a collection agency, often the labor costs involved are greater than the amount of the debt.

A system and method are desired that would make practical the collection of these low-value debts and that would assist the merchant or individual in recouping any delivered products or services.

SUMMARY OF THE INVENTION

To achieve the foregoing, and in accordance with the purpose of the present invention, an integrated pre-collections system is disclosed that makes practical and efficient the collection of low-value debts and also allows for the reclamation of any delivered products or services.

The pre-collections system employs computer software, rules and statistical analysis to make the collection of low-value, high-volume transactions cost effective and is optimized for transactions that cannot be efficiently handled by traditional collection systems. By contrast, traditional collection systems involve a high degree of human labor to contact debtors and collect funds. This present system may be used by first party or third party collection teams. As most electronic payments are not guaranteed, the pre-collections system is especially suited for use with electronic payments such as ACH items that might be returned for nonpayment. In any situation where a merchant or individual has ostensibly been paid (whether by check, financial account, or other) but the payment is returned and turns into a debt, the present invention is applicable.

In addition to supporting these traditional collections procedures, the pre-collections system identifies debtors when they contact a company for a new purchase (or a follow-on purchase), and allows a customer service representative (or other automated process) to take payment for the prior debt in real time. In this fashion, the pre-collections system is tightly integrated with an order processing system. Whether the customer is attempting to place an order, contact customer service, or contact the company for another reason, the customer is identified as a debtor and steps may be taken to collect the debt immediately in real time. For example, all order processing system channels (web site, IVR, CSR, etc.) are enabled to redirect the customer debtor into a corresponding pre-collections system channel. If the customer pays the outstanding debt in the pre-collections system they are then routed back seamlessly in real time to the point in the order processing system where they left off. The customer can be re-instated immediately when their payment is cleared.

In other words, the pre-collections system advantageously captures debtor customers in any non-collections context and places them into a pre-collections context so that the debt may be paid and the customer reinstated immediately. The pre-collections system does not require human intervention to clear up a bad debt before accepting a new order (i.e., the system mitigates the "shame factor" of the debtor). The pre-collections system automatically communicates with debtors via an IVR system and allows the debtor to pay off the debt using the IVR system without the intervention of a human agent.

The pre-collections system is also applicable to situations where digital products and other services are immediately fulfilled or consumed. Once a determination is made that a digital product or service should be reclaimed, the pre-collections system is enabled to direct that reclamation occur. For example, if a customer has downloaded digital music, software etc., the pre-collections system issues a command utilizing digital rights management that disables the music or software. Or, a customer holding a gift card and having a bad debt may suddenly find that his or her account has been frozen or reduced. For other digital products, the pre-collections system automatically connects to a product distribution system and attempts to reclaim any unused product in order to reduce the outstanding debt. In the event that the entire product is reclaimed, this collection process is fully automated. In another example, where a customer has purchased air time from a wireless carrier, the remaining minutes in that account may be canceled at direction of the pre-collections system. The pre-collections system is also able to reclaim all or part of a product or service. By performing reclamation immediately, it is more likely that more of the product or service can be reclaimed.

The pre-collections system includes resubmission and reclamation logic in order to identify the best time to resubmit or reclaim based on multiple variables. The pre-collections system evaluates the customer's order pattern, their payment history, and the prior resubmission success rate in real time when an ACH payment is returned, and then determines the most appropriate actions regarding whether to reclaim air time (or unused product value) or to resubmit the payment request at a specific time.

The pre-collections system is also tightly integrated with fraud and payment systems in real time. For example, the pre-collections system consults a central repository of blacklisted payment devices fed from all real-time order processing systems. For example, if the order processing system blacklists a card the pre-collections system also rejects the card as a payment device. The pre-collections system can also influence the central repository by initiating a request to the order processing system to un-blacklist certain entities (i.e., payment devices, stored value accounts, customers).

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
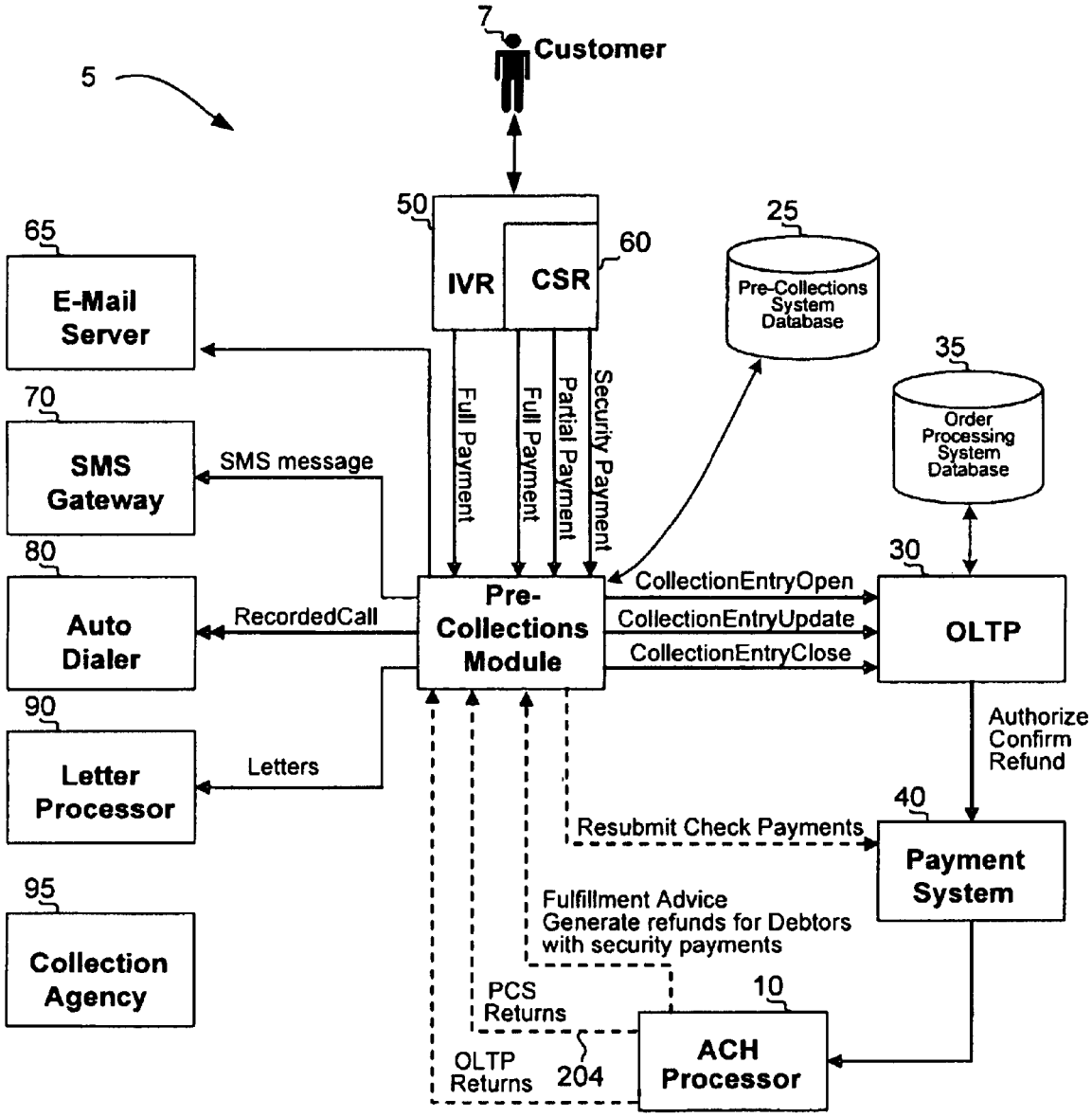
FIG. 1 is a block diagram of a pre-collections system according to one embodiment of the present invention.

FIG. 1 is a block diagram illustrating a pre-collections system 5 according to one embodiment of the invention. Pre-collections system 5 includes a pre-collections software module 20 in communication with a pre-collections database 25. Module 20 is a real-time, redundant software application that is primarily message driven although it does include batch portions. The solid lines connecting boxes indicate RPC messages, while the dashed lines indicate batch communication. Module 20 is preferably implemented on a number of load-balanced computer servers such as the Dell "Power Edge" servers. Module 20 is implemented as a state machine and proceeds to different states depending upon input regarding a particular customer. Customer 7 can also provide input to module 20 via IVR 50 or CSR 60.

Pre-collections system 5 includes an OLTP (Online Transaction Processing) system 30. In one specific embodiment, OLTP system 30 incinerates a web-based channel, an IVR (interactive voice response) channel and a CSR (customer service representative) channel. Also possible is an SMS chapel that allows a customer to place an order using an SMS text message or an automated recurring channel. Examples of such an OLTP system are a wireless top-up payment system, a mail-order catalog call center, or an electronic-commerce web site.

In one embodiment, numerous OLTP systems are each implemented on a computer server, with each OLTP system being dedicated to serving a particular client compan. (For example, each client wireless company uses a separate, or perhaps multiple, OLTP servers). An incoming customer uses any of a variety of payment devices, such as a credit card, debit card, paper check, electronic check, prepaid card or an electronic money micro-payment scheme, such as an account from the P2P service, Paypal, or Google Checkout, to pay for a product or service from one of the client companies.

A payment account debit submitted by a merchant may result in a returned item to the merchant if there are insufficient funds or other account issues such as incorrect account number, closed account, etc. Such a returned item is entered into the pre-collections system 5 as an open collection item. Of course, other types of transactions may also be used and be submitted to the pre-collections systems as a returned item. Examples of these other types of transactions are credit card chargebacks and P2P repudiated payments.

Other payment devices besides checks may also result in a returned item being submitted to the pre-collections system 5. For example, a credit card or debit card transaction may result in a chargeback that is then submitted to the system as a returned item. In these situations, because a chargeback exists, the pre-collections system will treat the chargeback similar to an outstanding debt and will flag the customer's order processing record (as explained below). Thus, if a customer attempts to reload a wireless account (for example) using the same credit card that was subject to the previous chargeback, the customer's account will be submitted to the pre-collections system for possible collection of the outstanding chargeback.

IVR 50 is typically an Interactive Voice Response (IVR) system such as used in a telephone-based OLTP system and is configured to process payment transactions from users wishing to pay their debt in full as a result of being contacted by the pre-collections system, or being re-routed there by the OLTP system's IVR 30. CSR 60 is typically an employee who is trained to handle full, partial or security payment transactions from users wishing to pay as a result of being contacted by the pre-collections system, or as a result of attempting to purchase a different or new product (i.e., being routed from OLTP when attempting to make a new purchase in OLTP system 30).

System 30 communicates with pre-collections software module 20 in numerous matters. In one situation, an IVR system of the OLTP system 30 transfers a customer call to IVR 50 when the customer calls regarding a new order (or other matter); the customer call is then routed back to the calling application (OLTP system) after debt payment is made. In a second situation, a real-time CSR application of the OLTP system connects to CSR system 60 via a hyperlink; the customer is then routed back to the calling application (OLTP system) after debt payment is made.

Payment system 40 is connected to one or more payment processors 10 and is a front-end system that initiates payment-to-payment to acquirers on behalf of a merchant or merchants. Payment processor 10 is a bank or other processor that may handle an ACH transaction, or other payment transaction as described above. As is known in the field, the ACH (Automated Clearing House) is a system of the U.S. Federal Reserve Bank that provides electronic funds transfer between banks. It is used for a variety of funds transfer transactions. ACH operations are typically done in a batch mode, which can take up to 72 hours before money is transmitted. A return notification (a returned item) is sent if the receiving depository financial institution (RDFI) is unable to fund a request from the originating depository financial institution.

E-mail server 65, SMS gateway 70 and auto-dialer 80 are typically used to send automated messages to the customer regarding unpaid debt. E-mail server 65 is a computer serverar ranged to send e-mail messages to customers. SMS gateway 70 is typically a third-party system connected to multiple wireless carriers (or is a gateway of a single carrier) suitable for transmitting text messages to wireless telephones. Auto-dialer 80 is a computer-based telecommunications device arranged to automatically dial and play recorded messages to customers, and allows customers to transfer to IVR 50 to make a payment in real-time, or to transfer to CSR 60 to speak with a representative and pay a debt. The pre-collections system adjusts the real-time queue for the auto-dialer based on current payment status. A debtor can be queued to the auto-dialer for various reasons. In real time as entries are de-queued there are various checks to insure the debtor should still be called. Some criteria that will affect the queued entries are: day of week, current time, time zone of the debtor, payment status, status updates on the debtor, etc. Letter processor 90 is used to send unpaid debt notices to a customer and is typically a third-part that specializes in sending mail notices. Collection agency 95 is typically a third party that handles collections that fail to be resolved by the pre-collections system and is known to those of skill in the art.

Each of these systems 65-95 is known to those of skill in the art. The systems may be external to operation of the pre-collections module 20, or may also be internal systems. In general, these systems are all mechanisms for contacting a customer and taking payment; of course, other systems and techniques to contact a customer may also be used. Further, each of systems 65-90 may also be implemented by a collection agency or by any entity holding a collections license.

PRE-COLLECTIONS PROCESS

Figure 2:
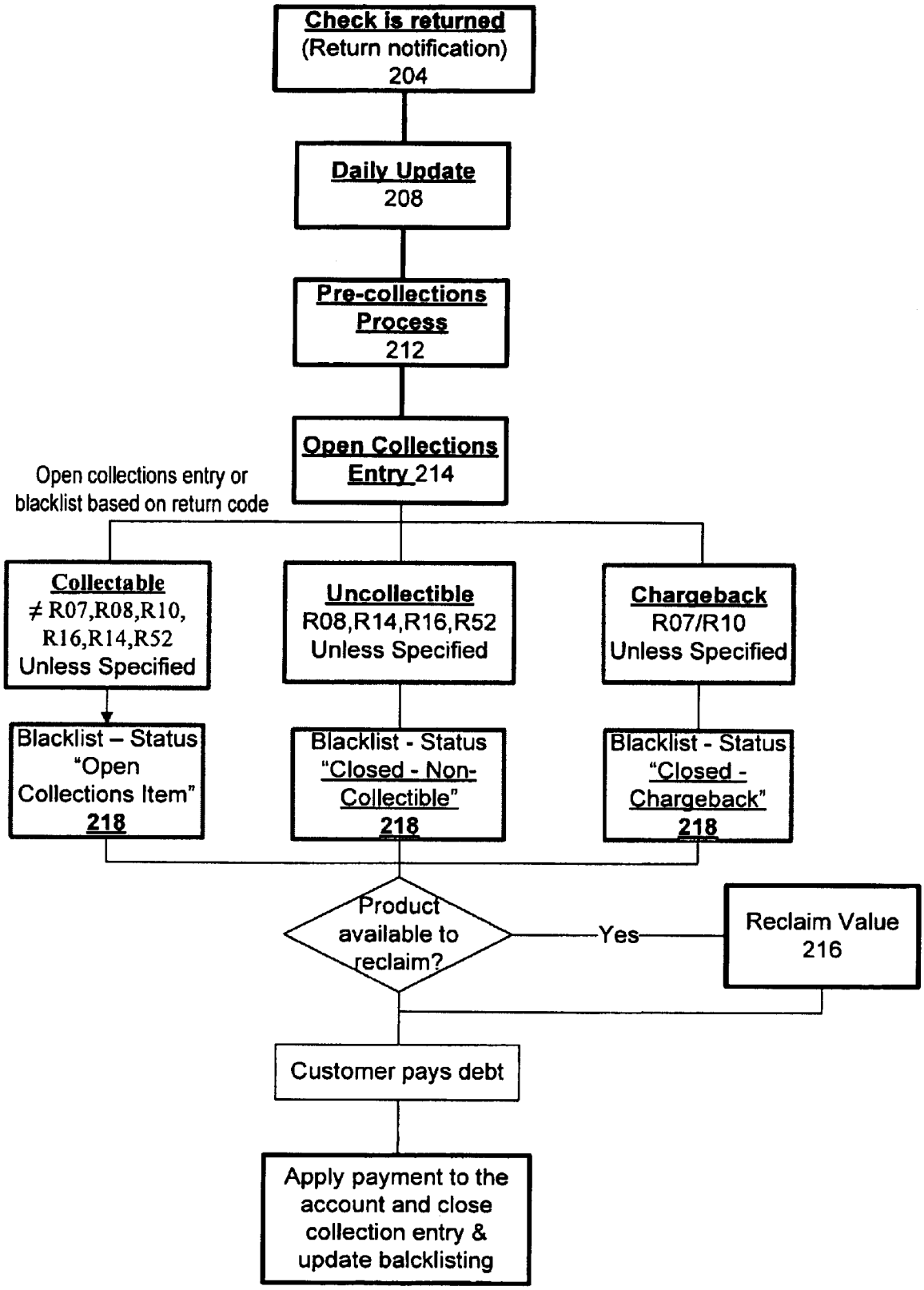
FIG. 2 is a flowchart of a method according to one embodiment of the present invention.

FIG. 2 is a flow diagram describing how a returned item triggers the pre-collections process. The pre-collections system (PCS) 5 is linked to payment processor 10 and is arranged to receive returned items. In step 204 pre-collections module 20 receives a returned item from the payment processor (ultimately coming from the receiving depository financial institution (RDFI)) indicating that payment by the customer was lacking funds (or perhaps due to another reason). If this returned item is the result of an attempted ACH payment, this may be any of a variety of ACH returned items. If the returned item is a result of an attempted ACH payment, the returned item is typically accompanied by a return reason code ("R" code) indicating the reason or the return, such as invalid account, unable to collect, resubmit, account closed, deceased, etc. Relevant return codes are listed in Table 1.

TABLE 1

| Return Codes |
|---|
| R01 - Insufficient funds |
| R02 - Account Closed |
| R04 - Invalid Acct Numbers |
| R09 - Uncollected Funds |
| R12 - Account Sold to Another DFI (formerly: Branch Sold to Another Bank) |
| R20 - Non-transaction account |
| R03 - No Acct, Unable to locate account |
| R07 - Authorization Revoked by Customer (only if a PPD tx or > first time TEL) |
| R08 - Stop Payment |
| R10 - Transaction not authorized |
| R14 - Payee Deceased |
| R16 - Account Frozen |
| R52 - Stop Payment |

Figure 3:
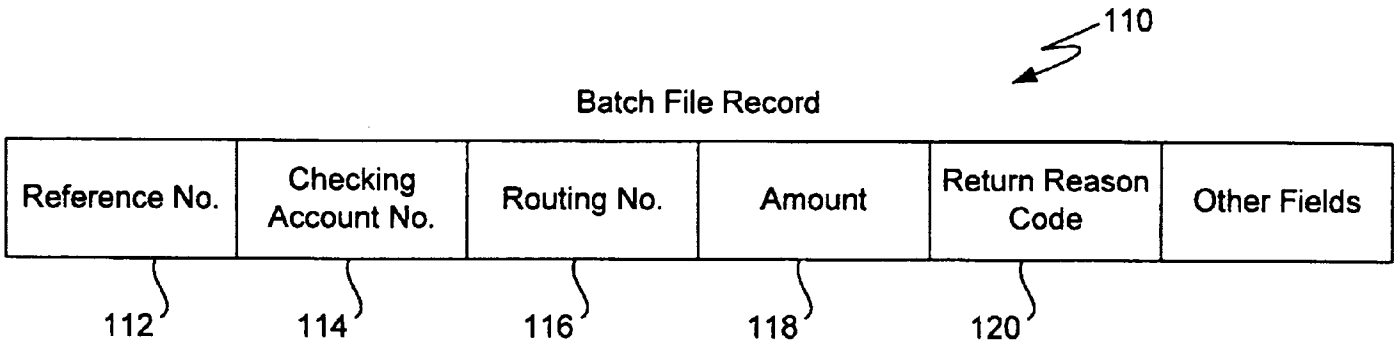
FIG. 3 is a batch file record.

Module 20 maintains a list of flags, each flag being associated with different categories of "R" codes. These flags are used to assist in controlling a state machine that implements the logic of the pre-collections module. In one specific embodiment, returned items are delivered from the ACH processor in the form of a daily batch file, typically one batch file per merchant. Each batch file is preferably in a standard format, and contains numerous batch file records 110 such as shown in FIG. 3. Each record indicates a returned item from a particular customer order (e.g., a bounced check). Reference number 112 is a unique identifier that identifies a particular returned (original) order. For example, when an order is submitted from order processing system 30 (for example) to payment system 40 an order number is supplied that identifies a particular customer order, and it is this order number that is used as the reference number. In this way, reference number 112 can be used to index a particular customer order from the order processing system 30.

Record 110 also includes the checking account number, routing number, amount, and a return reason code as shown. Other relevant fields include a return type code, a transaction code, a receiving DFI identification, a logo identification, a check digit, a DFI account number, and individual identification number, a check serial number, and individual name, a receiving company name, a card transaction type code, a record indicator, a trace number, etc. More detail can be found in the NACHA manual.

Figure 4:
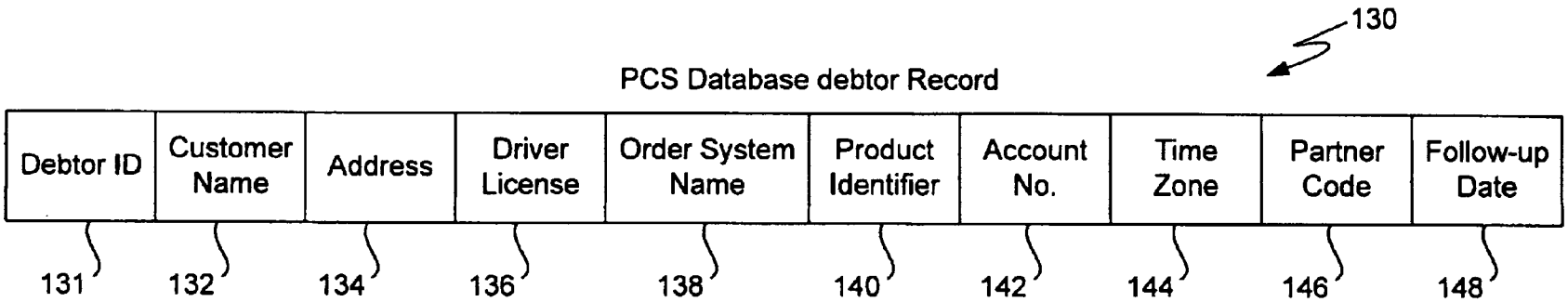
FIG. 4 is a PCS database debtor record.
Figure 6:
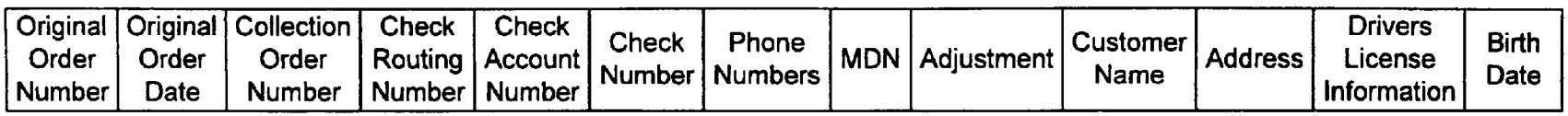
FIG. 6 is a response record.

In step 208 the received batch file is used by module 20 to create new collection entries within the pre-collections system. As previously mentioned, pre-collections system 5 includes a pre-collections system (PCS) database 25 that is linked to, or part of, pre-collections module 20. FIG. 4 illustrates an example debtor record 130 from that database. Record 130 will be expanded to include more and detailed information once a response from the "collection entry open" call is received as shown in FIG. 6.

In this step module 20 first creates a new debtor record 130 in database 25 for each returned item. Next, module 20 accesses OLTP processing system 30 using the reference number 112 from a batch file record in order to access a particular customer order. Once an order is identified using the reference number (i.e., the original order number) the relevant customer data and order data from that original order is retrieved and populated into the newly created debtor record in the PCS database 25. For example, the information retrieved and populated into debtor record 130 is customer name and birth date, address and telephone number, state and driver license innovation, the original OLTP system name, a product identifier, an account number (if applicable), the customer time zone, a partner code, and a follow-up date.

Thus, a new debtor record 130 is created in database 25 for each batch file record from the batch file received from the ACH processor. Each debtor record will be used by not only the pre-collections module 20, but also by the OLTP system 30 to attempt debt collection and to retrieve any unused goods or services.

Figure 5:
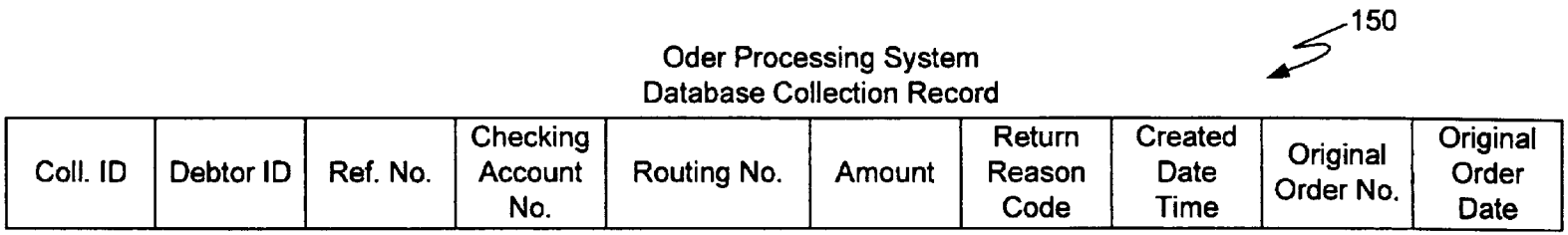
FIG. 5 is a collection record.

Step 212 begins the pre-collections process. The first step is a "Collection Entry Open" call 214 from module 20 to OLTP system 30. As shown, OLTP system 30 includes an OLTP processing system database 35. FIG. 5 illustrates an example collection record 150 from that database. When the call is made, the OLTP processing system creates such a new record in its database with information regarding the customer and the returned item. For example, record 150 includes a collection identifier, a debtor identifier, a reference number, a checking account number, a routing number, an amount, a return reason code, a date and time stamp, an original order number and an original order date.

The response from the order processing system in response to the "Collection Entry Open" call is a record as shown in FIG. 6. The "Collection Entry Open" call is initiated by the PCS and sent to the order processing system. The order processing system generates a response back to the PCS in the form of the record of FIG. 6, for example. This information in the response updates and populates the debtor record 130 of the PCS with additional information, and is also referred to as a "collection entry" once completed. The collection entry is managed by the PCS for the purpose of being collected on and generating outbound correspondence to the customer to notify them of this pending collection. The PCS manages the timing and coordination of a1l this outbound correspondents. The PCS also tracks all payments made on an open collection entry.

Database 35 is visible and used by all of the relevant channels by which the OLTP processing system is accessed, e.g., Web, IVR, CSR, etc. Thus, any future request by a customer coming to OLTP system 30 will necessarily raise a flag within the OLTP system if such a record is present in the database indicating that that particular customer (or a particular account) has had a returned item or is a debtor for any particular reason. The customer can then be redirected for debt collection.

In other words, in the event the customer returns for a subsequent purchase, regardless of the sales channel the customer uses (IVR, CSR, Web, etc.) to make the purchase, the OLTP system flags the order attempt using the customer's account information (payment device, telephone number, address, and a variety of data points) and redirects the customer to the pre-collections module 20 and possibly to an agent to discuss the outstanding debt. The customer account innformation is used to identify a customer; the OLTP system 30 references (or searches) each customer account field and, if a record is flagged as having an outstanding debt, the customer is redirected to module 20 for collection payment.

It should be noted that the customer may also be identified as a previous debtor in situations other than the customer returning for a subsequent purchase via the order processing system. For example, the customer may make personal contact with a particular store, make contact with a company representative over the telephone, by electronic mail, or by visiting a web site, for reasons unrelated to making a purchase. Examples of how a customer might make contact with the company and thus be able to be identified as a previous debtor include nearly any communication through which a company becomes aware of a particular customer's identity, becomes aware of a product or service that has been purchased and not paid for, or becomes aware of a particular payment device associated with an outstanding debt. For example, when the customer who owes money dials a telephone number they may automatically be switched to the collections center before their call is permitted to continue. Also, the customer can be contacted when engaging in unrelated activities with the same vendor (e.g., the customer logs in to ESPN.com to check their fantasy sports scores and is provided with notice about an unpaid bill on their ESPN mobile phone).

The customer may also directly reach pre-collections module 20 by calling either IVR 50 or CSR 60, by being transferred to either IVR 50 or CSR 60 by third party agency 95, by a real-time call transfer from a CSR of system 30 or from an IVR of system 30 using a hyperlink to CSR 60.

Once the customer is in communication with IVR 50 or CSR 60 (which in turn are in communication with module 20) the customer can elect to complete an automated process to remit the outstanding debt using the IVR, or the customer may talk with a CSR about remittance. Using IVR 50 or CSR 60 the customer is prompted for payment device information such as credit card, debit card etc. If the payment via the payment device is accepted, pre-collections module 20 marks the debt as paid in pre-collections system database 25, and in real time sends to OLTP system 30 a collection entry closed message that updates the collection record in OLTP system database 35.

The pre-collections system is programmable to handle various payment types identified by return codes. The system supports three payment options: cash, check or credit card. Two factors are applied to determine the allowable payment options for a debtor. One is the "R" code returned from the ACH network. The second is the Revenue Assurance specialist permission level. Also, a debtor might have multiple returned checks for multiple returned payments. In this case, the allowed payment options are determined by the most restrictive case.

In this fashion, a debtor customer is captured during a non-collections context and is redirected into the pre-collections system in order to more easily facilitate payment of the debt.

A second part of pre-collections process 218 involves blacklisting any suitable account, customer or payment device in order to flag that any future use of this account, future access by this customer, or future use of this payment device is suspect. In a preferred embodiment of the invention, blacklisting will always occur when an item is returned, i.e., blacklisting occurs in addition to any attempt to collect from the customer outside of a collections context. In particular, pre-collections module 20 is arranged to blacklist any stored value account, any particular customer, any particular driver's license, or any particular payment device used by customer (such as a credit or debit card). Blacklisting may be performed using a flag, database record, or other similar mechanism. In one specific embodiment, blacklisting is performed by OLTP system 30 by updating records in database 35 which match specific attributes such as payment device, driver's license number, customer number, account number, etc.

Blacklisting provides a second layer of protection, over and above the flagging of the customer using a debtor record as explained above. Because blacklisting is able to flag a particular payment device, a different customer returning to the OLTP processing system using the same payment device will be suspect. In addition, because a particular customer is also flagged, the same customer returning using a different payment device will also be suspect. Once the customer (or account or flagged payment device) returns via the OLTP processing system and it is determined that the customer, device or account has been blacklisted, control is shifted to a Revenue Assurance specialist (another type of customer service representative) who is alerted that the pending transaction is suspect. Control to the RA is performed via a phone transfer. The RA in one embodiment is a member of module 60.

At this point the customer is not necessarily turned over to IVR 50 or CSR 60 in order to be processed by precollections module 20, but such transfer is possible. Preferably, the RA specialist discusses the debt with the customer by telephone (or by e-mail, Internet chat, instant messaging, or by whatever means the customer has initiated contact) and attempts to arrange payment of the debt. The RA is able to arrange a full or partial payment of the customer using module 60 in a manner as described above. The RA can accept payment for the debt via credit card, in some cases via a new electronic check payment, or can provide the customer with instructions for mailing a paper check or money order, or initiating a payment though a money transfer service such as Western Union.

In this fashion, a blacklisted customer (or account or device) attempting to use the OLTP processing system is captured by pre-collections system 5 in order to settle a bad debt. Advantageously, the customer is captured outside of a normal collections process thus leading to a higher likelihood of payment.

A customer might interact with the system in different contexts. For example, a customer who initiates communication by performing a new transaction (such as in the purchase) or by making a subsequent purchase would typically be handled by IVR or CSR. The system is then able to flag a customer who is an existing debtor and attempt to resolve payment via one of these channels. Even if the customer is returning for a simple purchase, if the customer states he or she is not responsible for a previously unpaid purchase or has a special request (such as waving a late fee), then the system routes the customer to a RA specialist.

Alternatively, if a customer simply contacts the system to inquire about a collections letter received or other notice, the customer will typically be routed directly to the RA specialist. This specialist is more highly trained, can resolve particular issues and has the authority to make decisions regarding the outstanding debt. Both of these above routes occur before the outstanding debt is sent to a third-party collections agency for collection.

If the customer does not return for a subsequent purchase or other interaction with the system, the system automatically contacts the customer via telephone, mail, web, e-mail, SMS or other means to inform the customer of the returned ACH item. The customer may then return via module 50 or module 60 to respond to the requested payment of debt.

A third part of the pre-collections process seeks to recover any remaining product or service that the customer has not yet consumed in step Reclaim Value 216. In other words, once the customer and product he or she has ostensibly purchased has been identified (including other information such as an account number), pre-collections module 20 initiates action to reclaim any portion of this product or service not yet used. By attempting to reclaim any remaining value in the product or service immediately upon notification of a returned item, the pre-collections system has a much better chance of reclaiming a larger portion of that product or service before it is consumed by the customer.

For example, in the case of a mobile telephone wireless account, the system takes action to cancel any remaining minutes left in the customer's wireless account. This cancellation of the remaining minutes is performed by a real-time call over a network link to the wireless billing platform to deduct minutes. In another example, any prepaid minutes equal to the amount sold and associated with the debt in a long-distance calling plan are likewise deducted (or removed) in a similar manner as described above.

In another example, a customer holding any type of prepaid card (such as a gift card containing a dollar value) will find that the dollar value of that prepaid card account has been reduced by the amount of the failed attempt to add monetary value to the card. In this case, a real-time call over a network link to the card issuer's billing platform is made to deduct the correct monetary amount from the card balance.

This step 216 to reclaim any product or service that has been delivered to a customer is also applicable to most any digital product or service. For example, using technology known as digital rights management (DRM) a seller of any digital goods such as music, software, text, graphics, an electronic book, etc., can configure the digital goods in such a way so that the goods may be disabled at a future point in time. The use of digital rights management to control access to digital goods and to disable digital goods at a future point in time is well known to those in the field. Thus, once pre-collections module 20 is aware that a particular customer is in default of payment for a particular digital good or service, the pre-collections module initiates an action to disable that particular digital good or service using digital rights management technology embodied in that good or service. For example, a customer having downloaded music or software will suddenly find that the music or software suddenly will not play or work. Pre-collections module 20 can disable a digital good or service by marking or deactivating a license key in a centralized DRM scheme, or by preventing future digital purchases until the debt is collected.

Thus, the system automatically retrieves any unconsumed, fulfilled goods from the consumer or business customer. The outstanding balance for goods consumed but not paid is recorded in the system as an open collectable loss.

SYSTEM ANALYSIS

The pre-collections system employs rules and logic to determine whether it is more advantageous to attempt reclamation of fulfilled goods, to automatically resubmit for payment (for eligible returned items), or to contact the customer via another means. The pre-collections system creates a "collection score" to help determine system workflow. The pre-collections system evaluates the customer's payment history, order patterns, collectible amount, current collection staffing level and estimated collection cost in order to determine the most efficient course of action.

An administrator sets up a number of workflows in the system based on a product category. For example, one workflow is: attempt to reclaim product, call customer, send letter. Another workflow is: send letter, call customer, and send to third party agency. Based on the predicted collectable amount (which can be expressed as a percentile ranking of the debtor using statistical analysis), the system routes the collection account to the appropriate workflow. The system uses statistical analysis to optimize the series of steps so that the result is the highest payment for the returned ACH item at the lowest possible collection cost. The system uses three phases to perform the above process.

In the first phase, the system calculates a predicted collectible amount, a predicted resubmit success amount and a reclaimable amount, these values indicating respectively, how much could be collected from the customer, how much could be realized by resubmitting the returned item, and how much could be realized by reclaiming a product or service from the customer.

For a particular customer who owes a debt the system uses a logistic regression model to calculate a "predicted collectable amount" as below based on various demographic and transactional parameters. The collection score indicates a probability of the likelihood of the debt payment and indicates generally, good customers, average customers and bad customers. In other words, collection score indicates a probability of the collection being a success. For example, a collection score is calculated from the customer's zip code, information from the bank that maintains the customer's checking account, the product amount, the return reason code, and the customer's payment history.

$$\text{Predicted collectable amount} = (\text{amount due}) * (\text{collection score}) - \text{cost}.$$

The system also calculates a "predicted re-submit success amount" based on the demographic parameters, the amount due and the customer's payment history. The variable "resubmit success probability" is calculated by using the date or day of the returned check, product amount, zip code, bank and payment history. This variable indicates the probability of success of resubmitting the returned item and receiving payment.

Predicted re-submit success amount=(amount due)*(resubmit success probability−cost.

Next, the system calculates a reclaimable amount indicating how much value can be reclaimed from the customer by reclaiming a particular product or service that the customer is using. For example, the reclaimable amount is queried from a stored value device's platform. The reclaimable amount is the remaining unused value on the device.

Finally, the system compares these three values for a particular debt (predicted collectible amount, predicted resubmit success amount and reclaimable amount) and determines a particular workflow to obtain the highest payment on the debt. For example, the system might decide to attempt reclamation immediately, resubmit the item a day later, or proceed immediately to a collection. Or, the system might attempt reclamation of only a portion of the debt, and also attempt collection.

Phase two involves performing any reclamation or resubmission decided by the system. After any reclamations and resubmissions, phase three decides which debts to collect upon. The system compares the remaining "Predicted collectable amount" for all debts that need to be collected from all possible customers and maximizes collections by choosing the best subset of debtors on which to focus collections resources. In other words, the system may choose to initiate collections only on the top certain percentiles of the predicted collectible amount values based on staffing levels.

When the debt is paid, the customer is reinstated and new orders can be processed and fulfilled. In specified instances, the customer's future payment options are restricted. When the debt is paid in full—by any means, reclamation, payment or a combination of both—then the open collection account in the system is satisfied (i.e., it becomes zero). The customer no longer has outstanding debt; if the customer then returns to make future purchases, he or she can do so unimpeded. If the customer is a serial debtor, the account can be placed into a special status so that future orders are prevented even though the customer has fully paid his or her debts.

COMPUTER SYSTEM EMBODIMENT

Figure 7A:
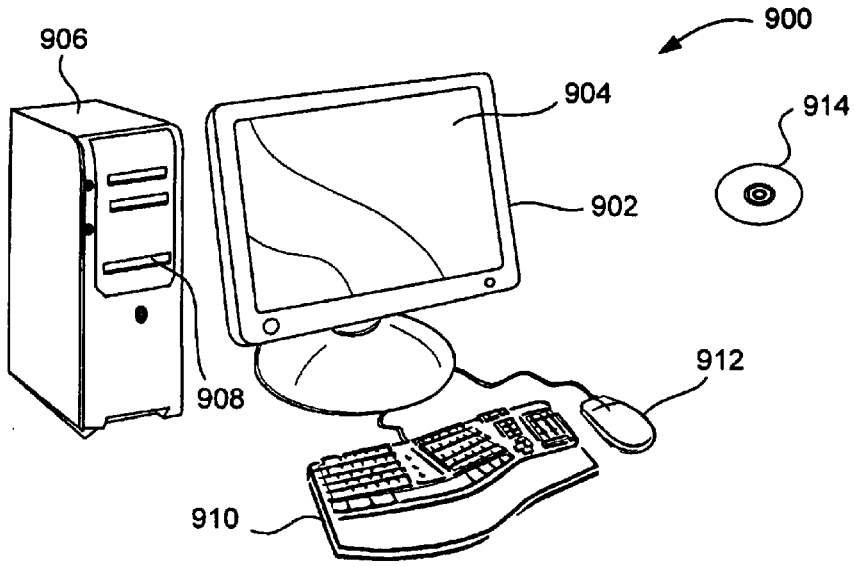
FIGS. 7A and 7B illustrate a computer system 900 suitable for implementing embodiments of the present invention.
Figure 7B:
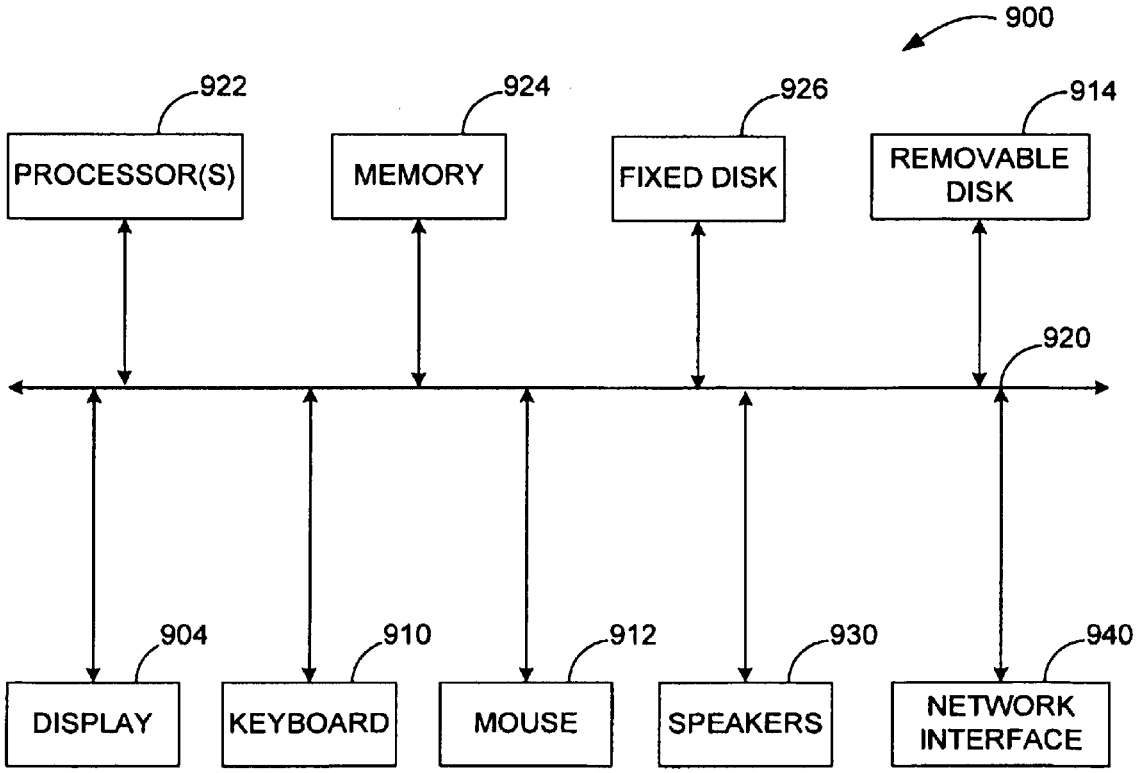

FIGS. 7A and 7B illustrate a computer system 900 suitable for implementing embodiments of the present invention. FIG. 7A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as visual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention futher relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and excute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of collecting a debt from a customer, said method comprising:

receiving a customer communication in a transaction processing system outside of a debt collection context;

checking a customer database associated with said transaction processing system to determine if said customer is flagged as owing a debt;

routing said customer communication from outside of said debt collection context to a pre-collections module when it is determined that said customer is flagged as owing a debt;

interacting with said customer via said pre-collections module in an attempt to collect said debt, whereby debt collection from said customer is initiated outside of said debt collection context.

2. A method as recited in claim 1 further comprising:

collecting said debt from said customer;

reinstating said customer as being debt free; and routing said customer communication from said pre-collections module back to said transaction processing system in real-time, whereby said customer continues said communication with said transaction processing system.

3. A method as recited in claim 1 further comprising:

automatically determining whether to collect said debt, reclaim a product or service associated with said debt, or resubmit a return item associated with said debt by reference to a collectible value, a resubmission value and a reclamation value.

4. A method to optimize debt collection within a computerized debt collection system, said method comprising:

identifying a customer who owes a debt;

choosing demographic and transactional parameters associated with said customer and said debt;

calculating a predicted collection value indicating a value of collecting on said debt;

calculating a predicted resubmission value indicating a value of resubmitting a return item associated with said debt;

calculating a predicted reclamation value indicating a value of reclaiming a portion of a product or service associated with said debt, said steps of calculating being performed by a computer; and choosing a course of action to address said debt of said customer based upon said predicted collection value, said predicted resubmission value and said predicted reclamation value.

5. A method as recited in claim 4 wherein choosing a course of action includes reclaiming said portion of said product or service, resubmitting said debt for payment, or contacting said customer.

6. A method as recited in claim 4 for the comprising:

calculating said predicted collection value using an amount of the debt, a collection score and a cost to collect said debt.

7. A method as recited in claim 4 further comprising:

identifying a plurality of debts within said debt collection system;

performing resubmission or reclamation for a first subset of said plurality of debts;

determining a predicted collection value for each of said plurality of debts; and determining an optimal second subset of said plurality of debts based upon said prediction collection value for each of said plurality of debts, said second subset not intersecting with said first subset.

8. A method as recited in claim 4 wherein said portion is airtime minutes of a telephone plan, a dollar value of a prepaid card, or digital goods.

9. A method of collecting a debt from a customer, said method comprising:

identifying said debt from said customer as being unpaid;

identifying said customer, an account or a payment device associated with said debt;

flagging in a database said customer, said account, a driver license number, an identification number or said payment device as being blacklisted;

receiving a customer communication in a transaction processing system outside of a debt collection context;

checking said database to determine if said customer, account, driver license number, identification number or payment device is flagged as being blacklisted; and routing said customer communication from said transaction processing system to a customer service representative, whereby an attempt is initiated to collect said debt outside of a debt collection context.

10. A method as recited in claim 9 further comprising:

collecting said debt from said customer;

reinstating said customer as being debt free; and routing said customer communication from said customer service representative back to said transaction processing system in real-time, whereby said customer continues said communication with said transaction processing system.

11. A method as recited in claim 9 further comprising:

receiving a returned payment item from a payment processor, said returned payment item indicating said debt from said customer as being unpaid, said step of receiving occurring before said first step of identifying.

12. A method as recited in claim 9 further comprising:

automatically determining whether to collect said debt, reclaim a product or service associated with said debt, or resubmit a return item associated with said debt by reference to a collectible value, a resubmission value and a reclamation value.

* * * * *